(12) United States Patent
Jonza et al.

(10) Patent No.: US 10,449,702 B2
(45) Date of Patent: Oct. 22, 2019

(54) LATERALLY-COALESCED FOAM SLAB

(71) Applicant: 3M INNOVATIVE PROPERTIES COMPANY, St. Paul, MN (US)

(72) Inventors: James M. Jonza, Woodbury, MN (US); Jeffrey P. Kalish, St. Paul, MN (US); Bryan C. Feisel, Hudson, WI (US); Brian L. Koster, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 216 days.

(21) Appl. No.: 15/517,033

(22) PCT Filed: Oct. 9, 2015

(86) PCT No.: PCT/US2015/054909
§ 371 (c)(1),
(2) Date: Apr. 5, 2017

(87) PCT Pub. No.: WO2016/064600
PCT Pub. Date: Apr. 28, 2016

(65) Prior Publication Data
US 2017/0246775 A1   Aug. 31, 2017

Related U.S. Application Data

(60) Provisional application No. 62/067,896, filed on Oct. 23, 2014.

(51) Int. Cl.
*B29C 44/46* (2006.01)
*B29C 48/07* (2019.01)
(Continued)

(52) U.S. Cl.
CPC ............ *B29C 44/468* (2013.01); *B29C 48/07* (2019.02); *B32B 5/02* (2013.01); *B32B 5/18* (2013.01); *B32B 5/22* (2013.01); *B32B 5/245* (2013.01); *B32B 7/12* (2013.01); *B32B 15/02* (2013.01); *B32B 15/046* (2013.01); *B32B 27/065* (2013.01); *B32B 27/36* (2013.01);
(Continued)

(58) Field of Classification Search
None
See application file for complete search history.

(56) References Cited

U.S. PATENT DOCUMENTS 3,121,130 A  2/1964  Wiley
3,573,152 A  3/1971  Wiley
(Continued)

FOREIGN PATENT DOCUMENTS

EP  2 397 303 A1  12/2011
FR  2265936 A1  10/1975
(Continued)

OTHER PUBLICATIONS

Extended European Search Report, EP15851762.3, dated Feb. 13, 2018, 3 pages.
(Continued)

*Primary Examiner* — Chinessa T. Golden
(74) *Attorney, Agent, or Firm* — Kenneth B. Wood

(57) ABSTRACT

Laterally-coalesced foam slabs and methods and apparatus, including foaming dies, for making and using such foam slabs.

19 Claims, 1 Drawing Sheet

(51) Int. Cl.
*B32B 5/02* (2006.01)
*B32B 5/18* (2006.01)
*B32B 5/22* (2006.01)
*B32B 5/24* (2006.01)
*B32B 7/12* (2006.01)
*B32B 15/02* (2006.01)
*B32B 15/04* (2006.01)
*B32B 27/06* (2006.01)
*B32B 27/36* (2006.01)
*E04C 2/20* (2006.01)
*E04C 2/296* (2006.01)
*B29C 44/04* (2006.01)
*B29C 44/24* (2006.01)
*C08L 23/12* (2006.01)
*C08L 67/00* (2006.01)
*E04B 1/80* (2006.01)
*E04B 1/86* (2006.01)
*E04B 1/90* (2006.01)
*E04C 2/284* (2006.01)

(52) U.S. Cl.
CPC .............. *E04C 2/205* (2013.01); *E04C 2/296* (2013.01); *B29C 44/04* (2013.01); *B29C 44/24* (2013.01); *B32B 2260/02* (2013.01); *B32B 2260/046* (2013.01); *B32B 2262/101* (2013.01); *B32B 2262/108* (2013.01); *B32B 2266/025* (2013.01); *B32B 2307/102* (2013.01); *B32B 2307/304* (2013.01); *B32B 2307/514* (2013.01); *C08L 23/12* (2013.01); *C08L 67/00* (2013.01); *E04B 1/80* (2013.01); *E04B 1/86* (2013.01); *E04B 1/90* (2013.01); *E04C 2/284* (2013.01)

(56) References Cited

U.S. PATENT DOCUMENTS

| | | |
|---|---|---|
| 3,624,192 A | 11/1971 | McCoy et al. |
| 3,881,984 A | 5/1975 | Soda |
| 4,801,484 A | 1/1989 | Yao |
| 5,429,840 A | 7/1995 | Raterman |
| 5,679,379 A | 10/1997 | Fabbricante |
| 5,773,080 A | 6/1998 | Simmons |
| 5,958,164 A | 9/1999 | Ishiwatari |
| 6,106,922 A | 8/2000 | Cejka |
| 6,251,319 B1 * | 6/2001 | Tusim ............ B32B 5/32 264/45.9 |
| 6,289,956 B1 | 9/2001 | Shriver |
| 6,440,241 B1 | 8/2002 | Mason |
| 7,951,449 B2 | 5/2011 | Ma |
| 2002/0026977 A1 | 3/2002 | Mason |
| 2005/0031854 A1 | 2/2005 | Lorenz |
| 2012/0248645 A1 | 10/2012 | Lavoie |
| 2012/0263906 A1 | 10/2012 | Ausen |
| 2012/0308755 A1 | 12/2012 | Gorman |
| 2013/0011600 A1 | 1/2013 | Ausen |
| 2013/0266766 A1 | 10/2013 | Vo |
| 2014/0093703 A1 | 4/2014 | Hanschen |
| 2014/0093716 A1 | 4/2014 | Hanschen |
| 2014/0234606 A1 | 8/2014 | Ausen |
| 2015/0047774 A1 | 2/2015 | Getschel |

FOREIGN PATENT DOCUMENTS

| | | |
|---|---|---|
| GB | 728981 | 4/1955 |
| GB | 1 202 127 A | 8/1970 |
| GB | 2 080 734 A | 2/1982 |
| JP | 2006-102959 | 4/2006 |
| JP | 2014-098076 A | 5/2014 |
| JP | 2014-098078 A | 5/2014 |
| KR | 10-2004-0069179 | 8/2004 |
| KR | 2010-0079657 A | 7/2010 |
| KR | 10-1069132 | 9/2011 |
| WO | WO 99/61520 A1 | 12/1999 |
| WO | WO 2001-039954 | 6/2001 |
| WO | WO 2006/081063 A2 | 8/2006 |
| WO | WO 2008-033973 | 3/2008 |
| WO | WO 2010-078065 | 7/2010 |
| WO | WO 2011-008396 | 1/2011 |
| WO | WO 2013-085773 | 6/2013 |
| WO | WO 2013-086021 | 6/2013 |
| WO | WO 2016-064819 | 4/2016 |
| WO | WO 2016-064829 | 4/2016 |

OTHER PUBLICATIONS

Gibson, Cellular Solids: Structure and Properties, 345-386, (1997).
International Search Report for PCT International Application No. PCT/US2015/056397, dated Dec. 22, 2015, 3 pages.
International Search Report for PCT International Application No. PCT/US2015/056385, dated Jan. 28, 2016, 4 pages.
International Search Report for PCT International Application No. PCT/US2015/054909, dated Jan. 25, 2016, 4 pages.

* cited by examiner

LATERALLY-COALESCED FOAM SLAB

BACKGROUND

Foamed articles have found wide use in various applications, thermal or acoustic insulation, reinforcing layers and/or space-filling layers, and so on.

SUMMARY

In broad summary, herein are disclosed laterally-coalesced foam slabs and methods and apparatus, including foaming dies, for making and using such foam slabs. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Figure 1:
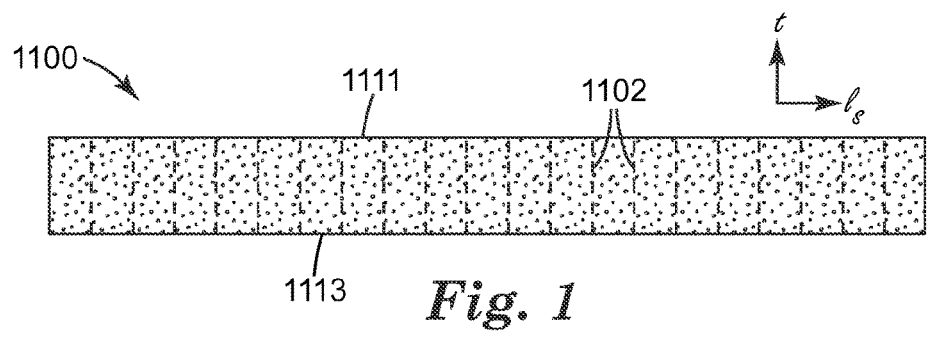
FIG. 1 is a plan view of an exemplary unitary foam slab, viewed along the long axis of the foam slab.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). For angular orientations, the term "generally" means within clockwise or counterclockwise 30 degrees. The term "substantially", unless otherwise specifically defined, means to a high degree of approximation (e.g., within +/−10% for quantifiable properties). For angular orientations, the term "substantially" means within clockwise or counterclockwise 10 degrees. The term "essentially" means within plus or minus 2% (plus or minus 2 degrees for angular orientations), and it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. Those of ordinary skill will appreciate that as used herein, terms such as "essentially free of", and the like, do not preclude the presence of some extremely low, e.g. 0.1% or less, amount of material, as may occur e.g. when using large scale production equipment subject to customary cleaning procedures. All references herein to numerical parameters (dimensions, ratios, and so on) are understood to be calculable (unless otherwise noted) by the use of average values derived from a number of measurements of the parameter, particularly for the case of a parameter that is variable (e.g., for an orifice whose width varies along the long axis of the orifice, the width of the orifice may be measured at several locations along the long axis of the orifice and an average value used for purposes of calculating an aspect ratio).

DETAILED DESCRIPTION

Glossary

By a foaming die is meant an extrusion die that is configured to withstand the pressures present in the extrusion of a molten foamable flowstream. By definition a foaming die comprises at least one die cavity configured to receive a molten flowstream e.g. from an extruder, and comprises a plurality of die orifices in fluid communication with the at least one die cavity.

By a molten foamable flowstream is meant a molten flowstream that comprises a molten foamable composition. In some cases such a flowstream may be a multilayer flowstream in which e.g. only one layer of the flowstream comprises a foamable composition.

By a molten foamable composition is meant a molten thermoplastic organic polymeric material that comprises a blowing agent (e.g., a physical blowing agent such as a gas or liquid; or, a chemical blowing agent that may chemically decompose e.g. at an elevated temperature, as discussed in detail later herein).

By non-foamable is meant a molten composition that is at least essentially free of activatable blowing agent (e.g., so that a solidified product of the molten composition is a non-foam material with a relative density that is at least essentially equal to 1.0.)

By a foam is meant an organic polymeric foam obtained by solidifying a molten foamable composition after the foaming process has proceeded to a desired extent.

By a foam slab is meant a foam entity with a length and a long axis, a lateral width and a lateral axis, and a thickness and a thickness axis, the three axes being orthogonal to each other and with the slab width being greater than the slab thickness. By definition, a foam slab is at least essentially compositionally uniform along the long axis of the slab. A foam slab admits the presence of densified (e.g. non-foam) material as a portion of the slab, as long as the densified material is made in the same operation as the foam portion of the slab, so that the portions collectively make up a unitary slab.

By unitary is meant an entity (e.g., a foam slab) that is made in a single operation by the coalescence and solidification of molten flowstreams and that cannot be separated into parts without unacceptably damaging or destroying the entity. A unitary entity may be a composite entity, as long as all portions (e.g. layers, members, etc.) of the entity were made and brought together with each other in a single (e.g. coalescing/solidifying) operation so that the portions cannot be separated from each other are not removable from each other.

By a composite foam slab is meant a unitary foam slab that comprises, in addition to a major foam phase, at least one minor foam phase comprising a densified material.

The term densified is used to distinguish a minor phase of a composite foam slab from a major, foam phase of the composite foam slab, and means that the minor phase exhibits a relative density that is at least about 15% higher than that of the major, foam phase. The term "densified" is used for convenience of description and does not signify that a "densified" material cannot be a foam, nor does it require that a densified material must be a material that was first made at a lower density and then processed to increase its density.

Relative density (e.g. of a foam material) is a dimensionless parameter obtained by dividing the overall density of a material (e.g., a foam comprising air-filled cells) by the density of the substance that makes up the cell walls of the material. Relative density is sometimes referred to as reduced density. For e.g. a polyester foam comprising a density of 0.5 g/cc and that comprises cell walls made of polyester that has a density of 1.35 g/cc, the relative density is about 0.37. For a conventional non-foam (and non-porous) material, the relative density will be at least essentially equal to 1.0.

Laterally-Coalesced Foam Slab

Disclosed herein is a laterally-coalesced unitary organic polymeric foam slab 1100, as shown in exemplary embodiment in FIG. 1. Foam slab 1100 exhibits a long axis (that corresponds to the extrusion direction of the flowstreams that coalesce to form the slab), a lateral axis ($l_s$) and a lateral width, and a thickness axis (t) and a thickness (which thickness by definition is less than the lateral width). By laterally-coalesced is meant a unitary foam slab that is made primarily by lateral coalescence of molten extrudate flowstreams, as defined in detail below.

Figure 2:
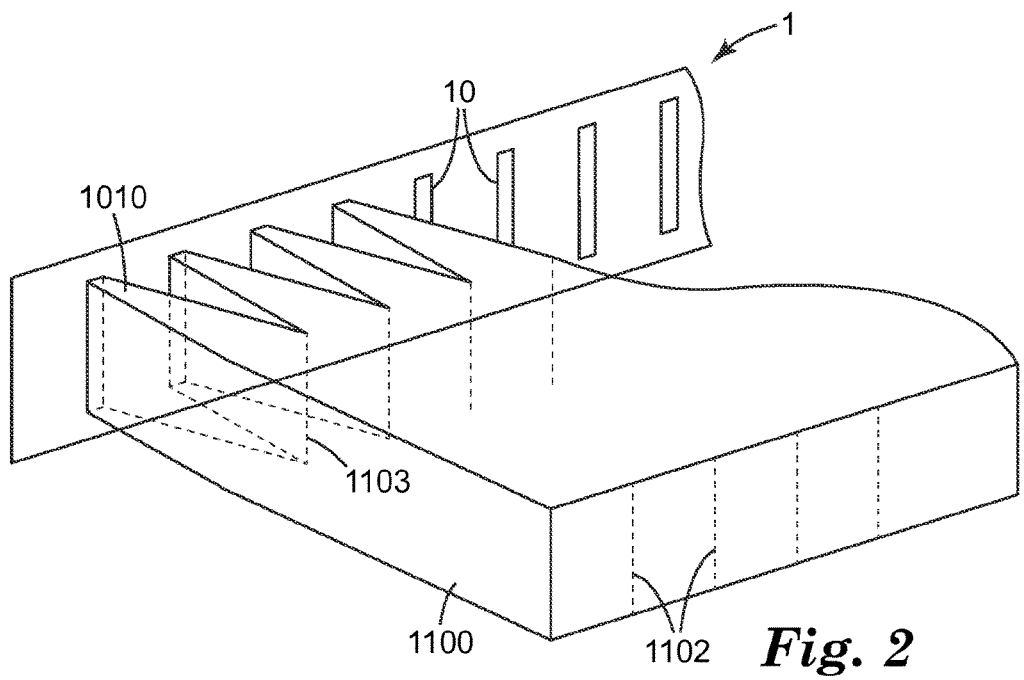
FIG. 2 is a front-side perspective view of an exemplary foam slab being produced from an exemplary foaming die.

Such a foam slab may be made e.g. by an exemplary apparatus and process as shown in FIG. 2, which shows an exemplary unitary foam slab 1100 being produced by the (lateral) coalescing and solidification of molten foamable extrudate flowstreams 1010 that are emitted from orifices 10 of die 1. The ordinary artisan will appreciate that the emitting of molten foamable extrudate flowstreams 1010 from a plurality of die orifices that are spaced along a lateral axis of the foaming die e.g. in a laterally-aligned pattern, which orifices have a long axis oriented at least substantially along the height axis of the die, may result in foam slab 1100 being formed primarily by lateral coalescence of the molten foamable extrudate flowstreams. That is, foam slab 1100 may be formed primarily by way of the molten flowstreams expanding (due in large part to the foaming that commences upon the streams exiting the die orifices) and spreading laterally (right and left in the depiction of FIG. 2) so as to meet each other and coalesce.

Such an orifice arrangement and the use thereof, and the resulting foam slab product, will be distinguished from arrangements in which a foam slab is produced by emitting a molten foamable extrudate flowstream through a small number of slot orifices (e.g., one orifice) that have a long axis oriented along the lateral axis of a die (e.g., as in a conventional "coathanger" style die/orifice). The ordinary artisan will appreciate that little or no lateral coalescence may occur in the use of such an "coathanger" style die/orifice design.

A laterally-coalesced foam slab may be identified e.g. by way of interfacial boundaries 1102 (shown in exemplary, idealized representation in FIGS. 1 and 2) that demarcate locations at which the lateral surfaces of neighboring flowstreams met each other (such a meeting-point 1103 is shown in FIG. 2) and bonded to each other. It will be appreciated that due to e.g. lateral spreading that may occur in the foaming process, in some embodiments interfacial boundaries 1102 may be spaced further apart (across the lateral width ($l_s$) of foam slab 1100) than the spacing of die orifices 10 from which the adjacent flowstreams 1010 originated.

Interfacial boundaries 1102 may be subtle, it being an advantage of the disclosures herein that the flowstreams may coalesce to form a unitary structure in such a complete manner that individual sections of the resulting foam slab coming from the different flowstreams may not easily be separable from each other, and might not be able to be distinguished by the simple expedient of cutting the slab in a cross-section and visually inspecting the exposed surface. (Such a laterally-coalesced foam slab thus possesses advantages over e.g. certain foam slabs described in U.S. Pat. No. 3,573,152 to Wiley, individual sections of which may be readily separated from each other.) However, such interfacial boundaries may be identified, e.g. by evaluating the size and/or shape of cells of the foam as a boundary is approached from either side. For example, the aspect ratio (e.g. of the cell dimensions along the thickness axis of the slab, relative to the cell dimensions along the lateral axis of the slab), or the local relative density, may be used to identify interfacial boundaries. Or, such interfacial boundaries may exhibit locally increased thickness of the cell walls (due e.g. to the collision and merging of laterally outwardmost cell walls of the two flowstreams). Or, the degree to which the cells are open or closed may differ at such an interface. In general, any suitable visual or optical method may be used for any such characterization. Such methods might rely on inspection (e.g. by visual inspection, optical microscopy, or electron microscopy). Or, methods such as e.g. reflectometry, hyperspectral imaging, light scattering, x-ray scattering, neutron scattering, etc., may be used.

Beyond these properties of the foam, other properties (such as the crystallization state) of the organic polymeric material that makes up the walls of the cells of the foam, may change at such an interfacial boundary. This may be identified e.g. by a change or discontinuity in e.g. melting temperature, glass transition temperature, tan delta, percent crystallinity, and so on. Interfacial boundaries may also be manifested e.g. as differences in indentation hardness in the region of a boundary, from that of regions far away (e.g. along the lateral axis of the foam) from a boundary. In embodiments involving a composite foam slab, an interfacial boundary between a major, foam phase and a minor, densified phase may often be identified by e.g. a change in the relative density; the particular case of an interfacial boundary between a major, foam phase and a minor, non-foam phase may be readily identified by a change from the presence of cells to the absence of cells.

By whatever method, interfacial boundaries of coalesced flowstreams may be identified by monitoring one or more properties of the foam as a foam slab is traversed. In a laterally-coalesced foam, such interfacial boundaries will be encountered and crossed mainly as the foam slab is traversed along the lateral axis ($l_s$) of the slab (i.e., along the width of the slab), rather than as the foam slab is traversed along the thickness axis (t) of the slab. Specifically, such interfacial boundaries will be primarily present as interfaces (e.g., at least substantially planar interfaces) 1102 that are at least generally aligned with the thickness axis (t) of the slab as shown in FIG. 1 (and that extend along the long axis of the slab). In contrast, for foams that are produced e.g. by a single coathanger-style slot die, few or no such interfacial boundaries may be present at all. Further in contrast, for foams that are produced by extrusion of flowstreams through a conventional array of orifices such as e.g. the orifice pattern depicted in FIG. 2 of U.S. Pat. No. 3,573,152, a significant number of interfacial boundaries may be encountered and crossed in traversing the foam slab in directions that are not along the lateral axis of the slab.

Thus, as disclosed herein, a laterally-coalesced foam slab is one in which multiple (e.g., at least four) identifiable interfacial boundaries are encountered in traversing the complete width of the foam slab along its lateral axis ($l_s$); and, in which at least about 80% of the total area exhibited by all of the interfacial boundaries of the slab in combination is at least generally aligned with the thickness axis (t) of the foam slab. In various embodiments, at least 6, 8, 10, 12, 14, 16, 20, 25, or 30 such interfacial boundaries (that are at least generally aligned with the thickness axis (t) of the foam slab) may be present. In further embodiments, at most about 5000, 2000, 1000, 500, 200, 100, 50, or 20 such interfacial boundaries may be present. (It will be appreciated that often, the number of interfacial boundaries may be (n−1), where n is the number of laterally-aligned die orifices 10 used to make the laterally-coalesced foam slab.)

In various embodiments, at least about 80, 85, 90, 95, 98, or at least essentially 100%, of the total area of all of the interfacial boundaries of the slab, are at least generally, at least substantially, or at least essentially, aligned with the thickness axis (t) of the foam slab. The exemplary representation of FIG. 1 shows a case in which 20 interfacial boundaries are present in foam slab 1100 and in which approximately 100% of the total combined area of all of the interfacial boundaries is at least essentially aligned with the thickness axis (t) of the foam slab. That is, such a slab will exhibit essentially no interfacial boundary area that is aligned with the lateral axis ($l_s$) of the slab, in contrast to e.g. the coalesced-strand foam slab shown in FIG. 4 of U.S. Pat. No. 3,573,152.

In various embodiments, at least about 60, 80, 90, or essentially 100% (by number) of interfacial boundaries 1102 extend at least generally along thickness axis (t) of the foam slab, over at least about 80, 90, 95, 98, or at least essentially 100% of the thickness of the foam slab.

In some embodiments, the unitary foam slab is a non-channeled foam slab. A non-channeled slab exhibits few or no internal macroscopic hollow (e.g., air-filled) elongate channels that extend along the long axis of the formed slab. (In some circumstances such channels might form, either unintentionally or by design, due to the failure of the surfaces of at least some of the molten foamable extrudate flowstreams to fully contact surfaces of other flowstreams before solidification of the flowstreams occurs.) Such a non-channeled slab is one that if cut in cross-section along a plane orthogonal to the long axis (extrusion direction) of the slab, will exhibit essentially no (that is, less than 1% on average, measured as a percentage of the total area of the cross-sectionally exposed surface) such internal macroscopic hollow elongate channels. (An internal macroscopic hollow elongate channel that extends along the long axis of the slab is not to be confused with an actual cell of the foam; also, slight irregularities along a major surface or minor edge of the foam slab are not considered to be an internal channel.)

A laterally-coalesced unitary organic polymeric foam slab may be comprised of any suitable organic polymeric materials, as discussed in detail elsewhere herein. Such a foam slab may comprise a foam that is an open-cell foam, or a closed-cell foam; or, mixtures of the two cell types may be present. The relative density of a foam slab (or, of a major, foam phase of a slab, e.g. if the foam slab is a composite foam slab that includes a non-foam material as discussed elsewhere herein) may have any suitable value. In various embodiments, the relative density may be less than about 0.85, 0.8, 0.7, 0.6, 0.5, 0.4, 0.3, 0.2, or 0.1. In further embodiments, the relative density may be greater than about 0.01, 0.05, 0.1, 0.15, 0.2, 0.3, or 0.4. The foam slab (or, again, a major, foam phase of a composite foam slab) may exhibit an average cell size in any suitable range. In various embodiments, the average cell size may be at most about 4000 microns, 2000 microns, 1000 microns, 800 microns, 600 microns, 400 microns, 200 microns, 100 microns, 80 microns, 60 microns, 40 microns, 20 microns, or 10 microns. In further embodiments, the average cell size may be at least about 1 micron, 5 microns, 10 microns, 15 microns, 20 microns, 25 microns, 30 microns, 40 microns, 50 microns, 100 microns, or 200 microns.

In various embodiments, a laterally-coalesced unitary organic polymeric foam slab may exhibit a shear modulus of at least about 1, 5, 10, 20, or 30 MPa. In various embodiments, a laterally-coalesced unitary organic polymeric foam slab may exhibit a compression modulus of at least about 1, 5, 10, 20, or 30 MPa. It will be appreciated that foam slabs of such properties may be well suited to serve as (e.g., at least semi-permanent) structural/reinforcing components, and are thus distinguished from e.g. organic polymeric foam slabs that are so weak as to be primarily used for e.g. space-filling or packaging applications.

Foam slab 1100 may be of any desired composition, derived e.g. from any suitable molten foamable composition comprising any desired organic polymeric material in combination with any suitable blowing agent. Suitable organic polymers may be chosen from any thermoplastic (melt-extrudable) composition, encompassing e.g. one or more homopolymers, co-polymers (whether random, block, graft, and so on), mixtures or blends of various homopolymers or copolymers, and so on. In particular embodiments, any such polymers may be branched (e.g., in order to provide higher melt strength), if desired. Suitable organic polymers may be chosen from e.g. polyolefins, polyesters, polyacrylics, polyamides, polycarbonates, polyurethanes, polystyrenes, and so on. Any suitable additives may be included as long as such additives do not unacceptably interfere with the foaming ability of the composition. For example, one or more inorganic additives such as mineral fillers, reinforcing fillers, pigments or the like may be used (e.g., talc, silica, clay, titania, glass fibers, glass bubbles, platelets, nanoparticles, nanotubes, and so on). Other additives might include antioxidants, ultraviolet absorbers, chain extenders, anti-static agents, hindered amine light stabilizers, hydrolytic stabilizers, nucleating agents, processing aids, flame retardants, coloring agents, slip agents, and so on. Any of these additives may be used in any desired combination.

In some embodiments, the organic polymeric material may be a polyolefinic material. A non-limiting list of suitable polyolefin materials includes e.g. polypropylene, polyethylene, polybutylene, poly(4-methyl-1-pentene), and copolymers and blends of any of these.

In some embodiments, the organic polymeric material may be a polyester material. By "polyester" is meant any material in which at least about 70% by weight of the organic polymeric material is a homopolymer and/or copolymer having ester linkages. In various embodiments, ester-linkage polymer chains make up at least about 80%, at least about 90%, at least about 95%, at least about 98%, or at least 99.5% of the weight of the material. In various embodiments, the polyester is at least 70% by weight polyethylene terephthalate, at least 80% by weight polyethylene terephthalate, at least 90% by weight polyethylene terephthalate, or at least 95% by weight polyethylene terephthalate. In further embodiments, the polyester material consists essentially of polyethylene terephthalate, which condition will be understood as not precluding the presence of a small amount (e.g., less than about 2.0 mole %) of monomeric units derived from glycols other than ethylene glycol.

Suitable polyesters include e.g. those commonly made by condensation polymerization of hydroxyl-containing monomers and/or oligomers (e.g., chain extenders) with poly-acid-containing or poly-ester-containing monomers and/or oligomers (e.g., dicarboxylic acids or diesters such as terephthalic acid, isophthalic acid, naphthalene dicarboxylate, etc.). Such polyesters may be made from poly-acids, or from any ester-forming equivalents of such materials (e.g., from any materials that can be polymerized to ultimately provide a polyester). Such polyesters may be made from any suitable hydroxyl-containing chain extender or combination of extenders. Commonly used chain extenders include for example the two-carbon diol, ethylene glycol (2G, when polymerized with terephthalic acids or esters yielding polyester "2GT"); the three-carbon diol, 1,3 propanediol (3G, when polymerized with terephthalic acids or esters yielding polyester "3GT"); and the four-carbon diol 1,4 butanediol (4G, when polymerized with terephthalic acids or esters yielding polyester "4GT"). Other names in use for 2GT are polyethylene terephthalate or PET, for 3GT are trimethylene terephthalate (PTT) or polypropylene terephthalate (PPT) and for 4GT polybutylene terephthalate or PBT. Polyesters may be made e.g. from any suitable poly-acid-containing or poly-ester-containing monomers or oligomers or combination thereof. In some embodiments, such monomers or oligomers may be selected such that the resulting polyester is an aromatic polyester; in other embodiments, they may be selected such that the resulting polyester is an aliphatic polyester. Blends of any of the above polyesters (e.g., aliphatic with aromatic) may be used, as can aliphatic/aromatic copolymers.

Further details of polyesters that may be useful (not only for use in a foamable composition, but also in a densified, e.g. non-foamable, composition) are described in U.S. patent application Ser. No. 14/363,132, entitled "Methods of Bonding Polyester Substrates", published on Feb. 19, 2015 as U.S. Patent Application Publication No. 2015/0047774, which is incorporated by reference in its entirety herein. In the particular instance in which a polyester is used in a foamable composition, it may be advantageous that the foamable composition include a chain extender (e.g. in order to enhance the melt strength of the molten composition). Often, anhydrides such as phthalic anhydride, maleic anhydride, or pyromellitic dianhydride (PMDA), and/or compounds such as certain aziridines, epoxides and diamines, are used for such purposes.

A molten foamable composition from which foam slab 1100 is derived may include any suitable blowing agent (sometimes referred to as a foaming agent), in any effective amount. Such blowing agents are often broadly categorized as physical blowing agents (meaning molecules that undergo a physical phase change, e.g. volatilization or evaporation, without any chemical reaction) or as chemical blowing agents (in which a chemical reaction typically occurs to liberate a gaseous or volatile molecule). Non-limiting examples of physical blowing agents include various gases (e.g., argon, helium, nitrogen, carbon dioxide, etc.). Further examples include volatilizable liquids, including hydrocarbons such as various propanes, butanes, pentanes, heptanes, and so on. Non-limiting examples of chemical blowing agents include e.g. azodicarbonamide, oxybis (benzene sulfonylhydrazide), phenyl tetrazole, and alkali carbonates comprising e.g., sodium carbonate and/or sodium bicarbonate).

In some embodiments, a laterally-coalesced unitary organic polymeric foam slab 1100 may consist essentially of an organic polymeric foam. That is, such a foam slab will be at least essentially uniformly made of a single monolayer of foam that extends uniformly throughout the length, width, and thickness of the slab (excepting interfacial boundaries as noted above), there being no minor phases (e.g., rails and/or sheet-like layers) of other materials present. This type of monolayer foam slab 1100 is depicted in exemplary embodiment in FIG. 1.

Figure 3:
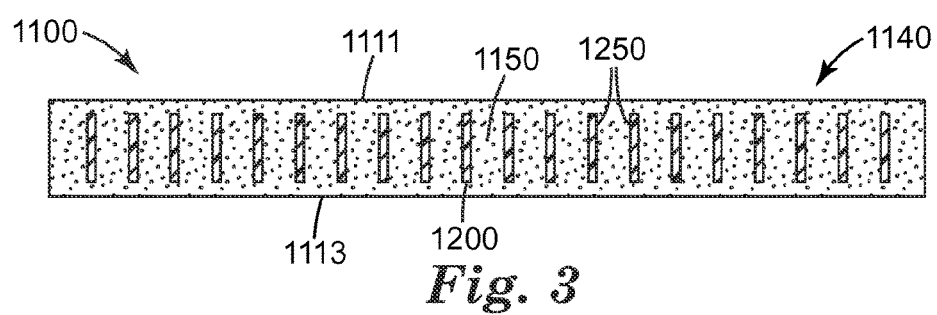
FIG. 3 is a plan view of an exemplary unitary composite foam slab, viewed along the long axis of the composite foam slab.
Figure 4:
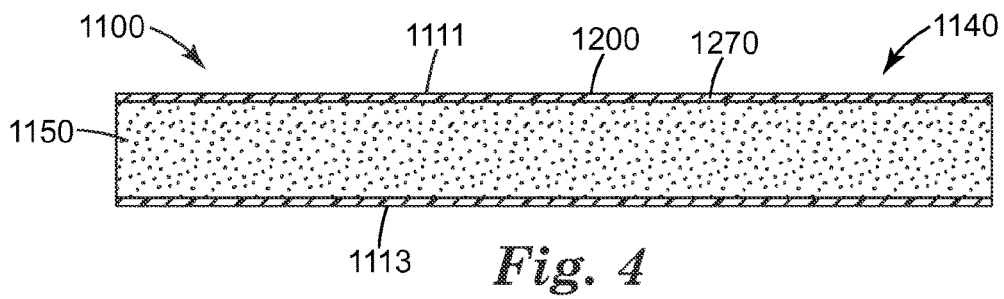
FIG. 4 is a plan view of another exemplary unitary composite foam slab, viewed along the long axis of the composite foam slab.

In other embodiments, a laterally-coalesced unitary organic polymeric foam slab 1100 may be a unitary composite foam slab 1140, as depicted in exemplary embodiments in FIGS. 3 and 4. A composite foam slab by definition comprises at least one major organic polymeric foam phase 1150 and at least one minor, organic polymeric densified phase 1200. By definition each phase, including the minor phase, is a macroscopic phase (e.g., a rail as depicted in FIG. 3, or a sheet-like surface layer as depicted in FIG. 4) that extends continuously along the long axis of the composite foam slab and is at least substantially aligned with the long axis of the slab. (Often, such a minor phase will be at least essentially aligned with the long axis of the slab.) Beyond this, by definition each minor phase has as second dimension that extends (e.g., along the thickness axis of the foam slab in the case of a rail, or along the lateral axis of the foam slab in the case of a sheet-like surface layer) a distance of at least about 2 mm, which distance is at least generally constant along the long axis of the slab.

Such a macroscopic minor phase cannot be provided by microscopic entities such as particles (e.g., mineral fillers, glass beads, microspheres, impact modifiers and so on), whiskers, fibers or threads, and so on. Nor can such a minor phase be provided by the presence of different domains (e.g., lamellae, spherulites, etc.) and the like that are well-known to occur on a microscopic scale in e.g. semicrystalline polymers. That is, while any such entities are permitted, and may be present, in a minor phase, the presence of such entities in and of themselves cannot provide a minor phase of a unitary composite foam slab as disclosed herein. In addition, such minor phases by definition exclude any already-formed entity that is introduced into the molten extrudate flowstreams in a pre-existing (solid) form, such as any type of pre-existing member, rod, strand, filament, netting, or the like that is introduced into the midst of the molten extrudate flowstreams so that the flowstreams encapsulate the entity at least partially within the thus-formed foam slab.

As noted in the Glossary, a densified, minor phase of a foam slab will exhibit a relative density that is at least about 15% higher than the relative density of the major, foam phase of the slab. For example, a densified, minor phase may be derived from a molten organic polymeric material that is similar or identical to that used to provide a major, foam phase of the foam slab, but that has a lower amount of blowing agent so as to provide a lessened degree of foaming. It is emphasized that the term densified does not signify or require any particular absolute density but merely denotes a minor phase with a relative density that is at least about 15% higher than that of the major, foam phase of a composite foam slab. In some particular embodiments, however, a minor, densified phase may take the form of a non-foam phase with a relative density of at least essentially 1.0.

In some embodiments, a densified, minor phase may differ in chemical composition from the major, foam phase of the foam slab. In some embodiments such differences may be relatively minor, which may advantageously promote or enhance the ability of the compositions to intermingle and/or physically or chemically bond to each other during a coalescing process. In specific embodiments, the densified, minor phase and the major, foam phase may be melt-bondable with each other.

In various embodiments, a densified phase may have a relative density that is at least about 50% higher, at least about 100% higher (i.e., is twice as high), or is 3, 4, 8, 16, 32, or 64 times the relative density of the major, foam phase. In further embodiments, a densified phase may have a relative density that is at most about 32, 16, 8, 4, or 2 times that of the major, foam phase. It is noted that the relative density of a non-foam (and non-porous in general) material will be at least essentially 1.0.

In various embodiments, a major, foam phase of a foam slab may make up at least about 40, 50, 60, 80, 90, 95, 98, or 99 volume percent of a composite foam slab. In further embodiments, the major, foam phase of a foam slab may make up at most about 99.5, 99, 97, 95, 90, 80, or 70 volume percent of a composite foam slab. In various embodiments, a minor, densified phase of a foam slab may make up at most about 60, 50, 40, 20, 10, 5, 2, 1, or 0.5 volume percent of a composite foam slab. (The terms major and minor are used for convenience of description to distinguish between a foam phase and a densified phase and do not necessarily require that the "major" phase must make up e.g. more than 50 volume percent of the composite foam slab.)

In further embodiments, the minor, densified phase of a foam slab may make up at least about 0.2, 0.5, 1.0, 3.0, 5, 10, 20, or 30 volume percent of a composite foam slab. (All such calculations are based on the nominal, macroscopic volumes of the major and minor phases.)

In some embodiments, a composite foam slab may comprise a major, foam phase in the form of a single, contiguous entity that is not interrupted by the presence of any intervening minor phase. The exemplary composite foam slab of FIG. 4 is an example of this type. In other embodiments, a composite foam slab may comprise a major foam phase that is at least partially interrupted by an intervening minor phase. The exemplary embodiment of FIG. 3 is an example of this type. In specific embodiments, a major, foam phase may be present in the form of multiple entities, that are e.g. completely interrupted by an intervening minor phase. The exemplary embodiment of FIG. 3 would be of this type, if at least some of the minor phase entities 1250 were to extend completely to the first and second major surfaces 1111 and 1113 of the foam slab. In such an embodiment, the entities of major, foam phase 1150 may nonetheless all be derived from the same molten composition and thus may all exhibit the same properties, e.g. relative density), if desired.

Similarly, in some embodiments, a composite foam slab may comprise a minor, densified phase in the form of a single, contiguous entity that is not interrupted by the presence of any intervening major phase. The exemplary composite foam slab of FIG. 4 is an example of this type. In other embodiments, a composite foam slab may comprise a minor phase that is at least partially interrupted by an intervening major, foam phase. The exemplary embodiment of FIG. 3 is an example of this type. FIG. 3 depicts an arrangement in which a minor phase 1200 is present as multiple discrete entities 1250. It is thus clear the term "phase" as used herein thus encompasses situations in which the phase is present as multiple discrete entities. In some embodiments, the entities of the minor phase may nonetheless all be derived from the same molten composition and thus may all exhibit the same properties (e.g. relative density), if desired. In some embodiments, a minor, densified phase of a unitary composite foam slab may be melt-bonded to the major, foam phase of the composite slab. In particular embodiments, a minor, densified phase, and a major, foam phase, may both be comprised of polyester.

In some embodiments, a unitary foam slab 1100 that is a unitary composite foam slab 1140 may comprise a major, foam phase 1150, and a minor, densified phase 1200 that is in the form of a plurality of elongate members 1250 that are spaced apart, along a lateral axis of the foam slab, across at least 70% of a width of the foam slab, wherein each elongate member extends continuously along the long axis of the composite foam slab. An exemplary design of this type is depicted in FIG. 3. In various embodiments, such elongate members may be spaced apart across at least about 80, 85, 90, or 95% of the width of the composite foam slab. In various embodiments, each minor-phase elongate member 1250 may comprise a relative density that is at least about two, four, six, or eight times the relative density of the major, foam phase 1150 of composite foam slab 1100.

In some embodiments, an elongate member may be in the form of an elongate rail 1250 that comprises a rail height that is at least substantially aligned with a thickness axis of the unitary composite foam slab and a rail width that is at least generally aligned with a lateral axis of the unitary composite foam slab. In this case, the rail height will be the end-to-end distance measured along the rail along the thickness axis of the slab, and will correspond to the second dimension (that has a value of at least about 2 mm) that was referred to in the definition of a minor phase. By definition, the rail height is greater than the rail thickness. In various embodiments, the rail height may be at least about 1.5, 2, 4, 6, 8 or 10 times the rail thickness (with average rail height and rail thickness being used in the case of e.g. a rail that varies in thickness along the height of the rail).

The rail height may be any suitable value relative to the thickness of the unitary composite foam slab. In various embodiments, the rail height may be at least about 20, 40, 60 80, 90, or 95% of the thickness of the unitary composite foam slab. In further embodiments, the rail height may be at most about 100, 99, 98, 95, or 90% of the thickness of the slab. Not all rails 1250 need be of the same, or even similar, rail height, although identical rails heights are shown in the exemplary embodiment of FIG. 3. In some embodiments an elongate member (e.g. a rail) 1250 may be "buried" at at least one end of the rail (along the thickness axis of the slab). By this is meant that that end of the member does not provide any portion of a major surface of the composite foam slab. Rather, a portion of the major, foam phase 1150 may overlie the rail, as in FIG. 3. The exemplary embodiment of FIG. 3 shows an arrangement in which both ends of rails 1250 are buried ends, for all rails 1250. In particular embodiments in which an elongate member is buried in this manner, the major surfaces of the composite foam slab (which in this case may be provided by major surfaces of the foam itself) are at least substantially free of "print-through", which phenomenon is defined as a lump or bulge in a major foam surface, caused by the presence of an elongate member (e.g., a rail) that is buried beneath in the major foam surface in the area of the lump or bulge.

Elongate members, e.g. elongate rails, may serve any useful function in a unitary composite foam slab. The ordinary artisan will appreciate that, for example, such rails may serve as reinforcing rails that advantageously enhance the bending stiffness, rigidity, structural integrity, and so on, of a unitary foam slab.

In some embodiments, a unitary foam slab 1100 that is a unitary composite foam slab 1140 may comprise a major, foam phase 1150, and a minor, densified phase 1200 that is in the form of a minor, surface layer 1270 that is a sheet-like layer that provides a provides a major outer surface 1111 of the composite foam slab, as shown in exemplary embodiment in FIG. 4. It will be appreciated that such a sheet-like surface layer 1270 will often extend continuously down the long axis of the foam slab 1140. Such a sheet-like surface layer can have any lateral width relative to the lateral width of major, foam phase 1150 that is desired. FIG. 4 depicts a specific embodiment in which the lateral width of a surface layer 1270 is at least essentially equal to that of major, foam phase 1150. However, in other embodiments, a surface layer 1270 may have a lateral width that is at least about 50, 60, 70, or, 90, or 95% of the lateral width of major, foam phase 1150. In further embodiments, a surface layer 1270 may have a lateral width that is at most about 100, 99, 98, 95, 90, 80, or 70 95% of the lateral width of major, foam phase 1150. It may be convenient to provide a surface layer 1270 as a single entity that extends across at least essentially the entire lateral width of the thus-formed unitary composite foam slab, as in FIG. 4. However, if desired, multiple surface layers 1270 might be provided (e.g. as stripes), that are spaced across the lateral width of major foam phase 1150, if desired. In various embodiments, such a sheet-like surface layer 1270 may have a thickness (e.g., an average thickness) that is less than about 25, 20, 15, 10, 5, 3, 2 or 1% of the total thickness of the composite foam slab. In various embodiments, a sheet-like surface layer 1270 may comprise a relative density that is at least about two, four, six, or eight times the relative density of the major, foam phase 1150 of composite foam slab 1100.

It will be appreciated that a unitary composite foam slab with a minor, densified surface layer of this general type will comprise an interfacial boundary between the major, foam phase and the minor, densified phase. This interfacial boundary will be oriented at least generally along the lateral axis of the foam slab. However, the major, foam phase will still exhibit a sufficient number of interfacial boundaries that are at least generally aligned with the thickness axis (t) of the foam slab so that the composite foam slab is a laterally-coalesced foam slab as defined herein.

The depiction of FIG. 4 shows an embodiment in which a unitary composite foam slab 1140 has first and second minor-phase surface layers 1270, one on each side of a central major, foam phase 1150. In such a case, a second such surface layer may have any of the above-described properties and attributes. In specific embodiments, a second such surface layer may have a composition and/or properties that are at least generally similar, at least substantially similar, or at least essentially the same as those of the first surface layer.

A sheet-like surface layer or layers may serve any useful function in a unitary composite foam slab. The ordinary artisan will appreciate that, for example, such a layer may serve as a tie layer that provides a foam slab with a major outer surface 1111 that is easier to bond to than is the (formerly) outermost surface of the major, foam layer 1150 itself. For example, if major, foam layer 1150 is comprised of polyester, a minor-phase surface layer may be used that is e.g. glycol-modified polyester. Such a material may be easier to melt-bond e.g. a biaxially-oriented polyester film to, than it would be to bond such a film directly to a major surface of a polyester major foam layer 1150 itself. A sheet-like surface layer may (whether in addition to, or instead of, serving as a tie layer) provide a reinforcing or stiffening function. For example, a unitary composite foam slab of the general type shown in FIG. 4, may provide a sandwich style foam composite in which two relatively thin surface layers of relative high density and thus e.g. inherently high stiffness (and which advantageously may be comprised of non-foam materials), outwardly sandwich an inner foam core of lower density. Still further, a sheet-like surface layer or layers 1270 may be derived from a molten composition that provides a higher barrier to passage of gases and/or vapors, than the molten composition from which is derived the major, foam phase 1150. In such case, the diffusional escape of the blowing agent from the growing cells of the incipient foam (e.g., in a direction at least generally along the thickness axis of the incipient foam slab) may be reduced from what it would be in the absence of the incipient sheet-like surface layer. This may e.g. provide that the growth of cells in the foam is limited or reduced so that a foam with smaller (average) cell size, e.g. a microcellular foam, may be advantageously produced.

In specific embodiments a unitary composite foam slab may exhibit minor phases both in the form of at least one sheet-like surface layer, and in the form of a plurality of elongate members. Such minor phases may or may not comprise the same composition.

A laterally-coalesced unitary organic polymeric foam slab, e.g. that is a unitary composite foam slab, may be made by any suitable method, as long as it provides a product that meets the definitions previously provided herein. In some embodiments, such a foam slab may be made by the use of a foaming die of the general type described in U.S. Provisional Patent Application Ser. No. 62/067,888, entitled FOAMING DIE AND METHOD OF USE, filed evendate herewith, which is incorporated by reference herein in its entirety. In some embodiments, such a foam slab may be made by the use of a foaming die of the general type described in U.S. Patent Application Ser. No. 62/067,890, entitled SHIM-STACK FOAMING DIE, filed evendate herewith, which is incorporated by reference herein in its entirety.

In some embodiments, a substrate (e.g., a sheetlike substrate) may be laminated to a major surface of unitary foam slab 1100. This may be done in any suitable fashion, using any desired lamination method, e.g. by the use of an adhesive or the like. In specific embodiments, it may be advantageous to perform such lamination in-line, meaning that a substrate is laminated to slab 1100 substantially immediately after slab 1100 is generated by coalescence of flowstreams 1010, by the use of a laminating apparatus that is physically co-located in-line with a foaming die 1 used to make slab 1100.

Any desired substrate may be laminated to any foam slab, as desired. Suitable substrates may be chosen from e.g. metal foils, metal meshes, inorganic fibrous webs such as fiberglass or rockwool, and so on. In some embodiments, a substrate to be laminated may be an organic polymeric substrate. In particular embodiments, such a substrate may be a fibrous material, e.g. a fabric, nonwoven web, woven or knitted web, scrim or netting, and so on, of any suitable composition. In some embodiments, such a substrate may be a fibrous material that is pre-impregnated with a reactive material (e.g., it may be a glass-fiber substrate that comprises a "pre-preg" such as an epoxy). In some embodiments, a substrate may be an organic polymeric film or sheet (including e.g. a fiber-reinforced film or sheet) of any suitable composition. In particular embodiments, such a film may be a polyester film, e.g. a biaxially-oriented polyester film. In specific embodiments, a polymer film that is to be laminated to a foam slab may be a flashlamped film. Details of processes by which films may be flashlamped are presented in detail in U.S. patent application Ser. No. 14/363,132, entitled "Methods of Bonding Polyester Substrates", published on Feb. 19, 2015 as U.S. Patent Application Publication No. 2015/0047774, which is incorporated by reference in its entirety herein.

In some embodiments, a unitary foam slab to which a substrate is laminated, may be a unitary composite foam slab comprising at least a major, foam phase and a minor, densified phase that may be e.g. made of a non-foam material. In some embodiments, the minor phase of such a composite foam slab may take the form of one or more elongate members as described herein. In some embodiments, the minor phase of such a composite foam slab may take the form of at least a first (and optionally a second) surface layer to which the substrate is laminated. It may be particularly advantageous that such a surface layer function e.g. as a tie layer to which a particular substrate may be more easily bonded than it might be bonded to the foam phase. For example, in specific embodiments, a tie layer comprising e.g. glycol-modified polyethylene terephthalate may be used, e.g. when a polyethylene terephthalate major foam phase (layer) is to have a polyethylene terephthalate substrate (e.g., film or nonwoven web) laminated thereto. In some embodiments, a first substrate may be laminated (e.g., in-line laminated via melt-bonding) to a first major surface of slab 1100, and a second substrate may be similarly laminated to a second major surface of slab 1100.

LIST OF EXEMPLARY EMBODIMENTS

Embodiment 1 is a laterally-coalesced unitary organic polymeric foam slab. Embodiment 2 is the unitary foam slab of embodiment 1, wherein the unitary foam slab comprises at least one major, foam layer that comprises a polyester foam or a polypropylene foam. Embodiment 3 is the unitary foam slab of embodiment 1, wherein the unitary foam slab consists essentially of a single layer of polyester foam or a single layer of polyolefin foam.

Embodiment 4 is the unitary foam slab of any of embodiments 1-3, wherein at least eight interfacial boundaries are encountered in traversing the width of the foam slab along a lateral axis of the foam slab; and, wherein the interfacial boundaries are at least generally aligned with a thickness axis of the foam slab. Embodiment 5 is the unitary foam slab of any of embodiments 1-3, wherein at least twelve interfacial boundaries are encountered in traversing the width of the foam slab along a lateral axis of the foam slab; and, wherein the interfacial boundaries are at least substantially aligned with a thickness axis of the foam slab. Embodiment 6 is the unitary foam slab of any of embodiments 1-3, wherein at least twenty interfacial boundaries are encountered in traversing the width of the foam slab along a lateral axis of the foam slab; and, wherein the interfacial boundaries are at least essentially aligned with a thickness axis of the foam slab.

Embodiment 7 is the unitary foam slab of any of embodiments 1-6, wherein the foam slab is a unitary composite foam slab that comprises a major organic polymeric foam phase that makes up from about 50 volume % of the slab to about 99.5 volume % of the slab and that comprises a relative density of less than about 0.85, wherein the unitary composite foam slab comprises a minor, organic polymeric densified phase that makes up from about 0.5 volume % to about 50 volume % of the unitary composite foam slab and that comprises a relative density that is at least about 50% greater than the relative density of the major organic polymeric foam phase, and wherein the major phase and the minor phase each extend continuously along a long axis of the unitary composite foam slab.

Embodiment 8 is the unitary composite foam slab of embodiment 7 wherein the minor, densified phase of the unitary composite foam slab is melt-bonded to the major, foam phase of the unitary composite foam slab. Embodiment 9 is the unitary composite foam slab of embodiment 8 wherein the minor, densified phase of the unitary composite foam slab, and the major, foam phase of the unitary composite foam slab, are both comprised of polyester or are both comprised of polyolefin.

Embodiment 10 is the unitary composite foam slab of any of embodiments 7-9 wherein the minor, densified phase of the composite foam slab is in the form of a plurality of elongate members that are spaced apart, along a lateral axis of the foam slab, across at least 70% of a width of the foam slab, wherein each elongate member extends continuously along the long axis of the composite foam slab, and wherein each elongate member comprises a relative density that is at least about four times the relative density of the major, foam phase of the composite foam slab. Embodiment 11 is the unitary composite foam slab of embodiment 10 wherein each elongate member is in the form of an elongate rail that comprises a rail height that is at least substantially aligned with a thickness axis of the unitary composite foam slab and a rail width that is at least generally aligned with a lateral axis of the unitary composite foam slab, and wherein the rail height is at least four times the rail width, and wherein the rail height is at least about 80% of the thickness of the unitary composite foam slab. Embodiment 12 is the unitary composite foam slab of any of embodiments 10-11 wherein each elongate member consists essentially of a non-foam material that is melt-bonded to the major, foam phase of the unitary composite foam slab.

Embodiment 13 is the unitary composite foam slab of any of embodiments 7-9 wherein the minor, densified phase of the unitary composite foam slab is in the form of a minor, surface layer that is a sheet-like layer that provides a major outer surface of the unitary composite foam slab, that has a thickness that is less than about 10% of a total thickness of the unitary composite foam slab, and that exhibits a relative density that is at least about four times the relative density of the major, foam phase of the unitary composite foam slab. Embodiment 14 is the unitary composite foam slab of embodiment 13 wherein the minor, surface layer of the unitary composite foam slab consists essentially of a non-foam material that is melt-bonded to the major, foam phase of the unitary composite foam slab. Embodiment 15 is the unitary composite foam slab of any of embodiments 13-14 wherein the minor, surface layer of the unitary composite foam slab, and the major, foam phase of the unitary composite foam slab, are both comprised of polyester or are both comprised of polyolefin.

Embodiment 16 is the unitary composite foam slab of any of embodiments 7-9 wherein the minor, densified phase of the unitary composite foam slab is in the form of: a first minor surface layer that is a first sheet-like layer that provides a first major outer surface of the unitary composite foam slab, that has a thickness that is less than about 10% of the total thickness of the unitary composite foam slab, and that exhibits a relative density that is at least about four times the relative density of the major phase of the unitary composite foam slab; and, a second minor surface layer that is a second sheet-like layer that provides a second major outer surface of the unitary composite foam slab, that has a thickness that is less than about 10% of the total thickness of the unitary composite foam slab, and that exhibits a relative density that is at least about four times the relative density of the major phase of the unitary composite foam slab. Embodiment 17 is the unitary composite foam slab of embodiment 16 wherein the first minor, surface layer of the unitary composite foam slab, the second minor, surface layer of the unitary composite foam slab, and the major, foam phase of the unitary composite foam slab, are all comprised of polyester or are all comprised of polyolefin.

Embodiment 18 is an article comprising the unitary composite foam slab of any of embodiments 1-17 with a substrate laminated to at least one major surface of the unitary composite foam slab. Embodiment 19 is the article of embodiment 18 wherein the substrate is a biaxially oriented polymer film or a laminated stack of biaxially oriented polymer films. Embodiment 20 is the article of embodiment 18 wherein the substrate is chosen from the group consisting of a fiber-reinforced polymeric film or sheet, a woven fabric, a knitted fabric, a nonwoven, and a metal foil.

EXAMPLES

Representative Working Example

A shim-stack foaming die was assembled of the general type described in copending U.S. Provisional Patent Application Ser. No. 62/067,890 filed evendate with the present application, entitled Shim-Stack Foaming Die. The foaming die had fifty laterally-aligned, elongated orifices that were spaced across the lateral width of the thus-formed foaming die in a single row, each with an orifice width ($W_o$) of 16 mils and with an orifice height ($H_o$) of 625 mils. Rather than using single orifice shims (of thickness 16 mils) to provide this orifice width, orifice shim bundles were used, each bundle comprised of four orifice shims of 4 mils thickness. Spacer shims were used to space the orifices at an edge-to-edge distance ($d_e$) of approximately 60 mils (thus providing a center-to-center orifice distance ($d_c$) of 76 mils). Rather than single spacer shims being used, spacer shim bundles were used, each bundle being comprised of three shims of 20 mil thickness.

The shim-stack foaming die thus had a total of 347 shims (200 total orifice shims in 50 bundles of 4 shims each, and 147 total spacer shims in 49 bundles of 3 shims each), defining 50 die orifices in all; a first set of 25 orifices in fluid communication with a first die cavity and a second set of 25 orifices in fluid communication with a second die cavity. In this Representative Working Example a molten foamable flowstream was only fed to the first die cavity (and from there to the first set of 25 "active" die orifices to which that die cavity was fluidly connected). It will thus be understood that each pair of nearest-neighbor active die orifices was interspersed by an inactive (unused) die orifice through which no molten extrudate was emitted. (Strictly speaking, in this mode of operation each pair of active die orifices was spaced apart not purely by spacer shims, but also by orifice shims that provided an inactive die orifice therebetween.)

Thus in summary, the foaming die defined 25 active die orifices, that were arranged at an edge-to-edge spacing of approximately 136 mils (and a center-to-center spacing of approximately 152 mils) to provide an active die width $W_d$ of approximately 3.74 inches. (The orifice height $H_o$ and die height $H_d$ were not affected by the fact that only one of the die cavities was used).

All shims were made of stainless steel that had been EDM (electrodischarge machining) cut to the desired shape and to provide cutouts as desired. All shims were held together by four bolts passed through cutouts in the shim-stack. These bolts were tightened with as much torque as possible using an air powered torque wrench. Edge heaters were coupled to the top and bottom of the die. Thermocouples were used for temperature monitoring in customary fashion.

A foamable composition was prepared, comprising thermoplastic polyester (PET) resin (POLYCLEAR 1101; Auriga, Charlotte, N.C.) at 95 wt. %, a chemical blowing agent (Sukano TA17-10; Duncan, S.C.) at 2 wt. %, and a chain extender (Sukano $T_{me\ s}606$) at 3 wt. %. The foamable composition was loaded into the hopper of a 1.25" single screw extruder and was extruded under the conditions listed in Table 1:

TABLE 1

| Parameter | Value |
| --- | --- |
| Screw RPM | 68.1 |
| Zone 1 (F.) | 432 |
| Zone 2 (F.) | 540 |
| Zone 3 (F.) | 547 |
| Adapt (F.) | 494 |
| Necktube (F.) | 510 |
| Die (F.) | 500 |
| Die edge heaters (F.) | 520 |
| Pressure (psi) | 2200 |

The die was oriented with its lateral axis approximately horizontal to the Earth surface. A takeaway belt was positioned a few centimeters below the working face of the die, oriented approximately horizontal to the Earth surface. The die was oriented so that the direction of flow of molten extrudate out of the die orifices was angled slightly downward (at an angle of approximately 15 degrees below horizontal) toward the upper surface of the takeaway belt so that the molten extrudate was collected on the takeaway belt. The takeaway belt speed was approximately 0.6 feet per minute.

Under these conditions, the coalescence distance ($D_e$) was estimated to be within a few (e.g. 1-3) mm of the working face of the die. The thus-formed laterally-coalesced unitary foam slab exhibited approximate (average) values of 0.35 g/cc density, 5.8 inch width, and 1.3 inch thickness.

Working Example 2

A shim-stack foaming die was used of the general type described in the Representative Working Example, except that the die with had fifty active orifices, each 24 mils in width and 625 mils in height. Rather than using single orifice shims, orifice shim bundles were used, each bundle comprising six orifice shims of 4 mils thickness. Spacer shims were used to space the orifices at an edge-to-edge distance ($d_e$) of approximately 80 mils (thus providing a center-to-center orifice distance ($d_c$) of 104 mils). Rather than single spacer shims being used, spacer shim bundles were used, each bundle being comprised of four shims of 20 mil thickness.

This die design had a total of 496 shims and was 5.1 inches wide. Two foamable compositions were prepared, each of the same composition as for the Representative Example. The foamable compositions were each loaded into a hopper of a 1.25" single screw extruder; two such extruders were used, one feeding a first die cavity and first die orifice set, the second feeding a second die cavity and second die orifice set. Thus, in this Example, all die orifices were active orifices and all were fed the same molten foamable composition (although from two different extruders.)

The two compositions were extruded under the conditions listed in Table 2 (the extruders were not identical in configuration so they were operated at somewhat different conditions):

TABLE 2

| Parameter | Extruder #1 | Extruder #2 |
| --- | --- | --- |
| Screw RPM | 58.1 | 29 |
| Zone 1 (F.) | 436 | 460 |
| Zone 2 (F.) | 519 | 520 |
| Zone 3 (F.) | 539 | 540 |
| Adapt (F.) | 513 | 520 |
| Necktube (F.) | 490 | 476 |
| Pressure (psi) | 2600 | 4000 |
| Die (F.) | 480 | |
| Die edge heaters (F.) | 480 | |

The takeaway belt speed was approximately 0.6 feet per minute. Under these conditions, the coalescence distance ($D_e$) was estimated to be within a few (e.g. 1-3) mm of the working face of the die. The thus-formed laterally-coalesced unitary foam slab exhibited approximate (average) values of 0.36 g/cc density, 5.5 inch width, and 1.4 inch thickness.

Working Example 3

The shim-stack foaming die of Working Example 2 was used. Two identical foamable compositions were prepared, each comprising high melt strength polypropylene (Borealis WB140HMS; Vienna, Austria) at 98 wt. %, and a chemical blowing agent (Reedy FPE-50; Charlotte, N.C.) at 2 wt. %. The foamable compositions were each loaded into a hopper of one of two 1.25" single screw extruders, each extruder feeding a different die cavity, in the same manner as in Working Example 2.

The two compositions were extruded under the conditions listed in Table 3:

TABLE 3

| Parameter | Extruder #1 | Extruder #2 |
| --- | --- | --- |
| Screw RPM | 83.4 | 80.2 |
| Zone 1 (F.) | 350 | 350 |
| Zone 2 (F.) | 430 | 430 |
| Zone 3 (F.) | 433 | 400 |
| Adapt (F.) | 370 | 370 |
| Necktube (F.) | 370 | 360 |
| Die (F.) | 340 | |
| Die edge heaters (F.) | 340 | |
| Pressure (psi) | 2000 | 2400 |

The takeaway belt speed was approximately 0.6 feet per minute. Under these conditions, the coalescence distance ($D_e$) was estimated to be within a few (e.g. 1-3) mm of the working face of the die. The thus-formed laterally-coalesced unitary foam slab exhibited approximate (average) values of 0.54 g/cc density, 3.8 inch width, and 0.6 inch thickness.

Working Example 4

A shim-stack foaming die was assembled of the type described in the Representative Working Example, except that the die with had fifty active orifices, each 16 mils in width and 625 mils in height. Rather than using single orifice shims, orifice shim bundles were used, each bundle comprised four orifice shims of 4 mils thickness. Spacer shims were used to space the orifices at an edge-to-edge distance ($d_e$) of approximately 60 mils (thus providing a center-to-center orifice distance ($d_c$) of 76 mils). Rather than single spacer shims being used, spacer shim bundles were used, each bundle being comprised of three shims of 20 mil thickness.

This die design had a total of 347 shims and was 3.74 inches wide. A first, foamable composition was prepared, of the same composition as in the Representative Working Example. A second composition was prepared, that was PET-G (polyethylene terephthalate-glycol modified; EASTAR Copolyester 6763, Eastman Chemical, Kingsport, Tenn.). The second composition was not a foamable composition. The first and second compositions were respectively fed to first and second 1.25" extruders, and were processed under the conditions listed in Table 4:

TABLE 4

| Parameter | 1st Extruder/ composition | 2nd Extruder/ composition |
| --- | --- | --- |
| Screw RPM | 102 | 15.2 |
| Zone 1 (F.) | 442 | 480 |
| Zone 2 (F.) | 540 | 500 |
| Zone 3 (F.) | 538 | 500 |
| Adapt (F.) | 484 | 500 |
| Necktube (F.) | 518 | 474 |
| Pressure (psi) | 3800 | 2400 |
| Die (F.) | 480 | |
| Die edge heaters (F.) | 500 | |

The takeaway belt speed was approximately 0.6 feet per minute. Under these conditions, the coalescence distance ($D_e$) was estimated to be within a few (e.g. 1-3) mm of the working face of the die. The thus-formed laterally-coalesced unitary composite foam slab exhibited approximate (average) values of 0.32 g/cc density, 5.8 inch width, and 0.75 inch thickness.

Working Example 5

A shim-stack foaming die was assembled of the type described in the Representative Working Example. A single 1.25" extruder was used to feed the same foamable composition as in the Representative Working Example, to a single cavity and die set of the die, in the same manner as in the Representative Working Example. The foamable composition was processed under the conditions listed in Table 5:

TABLE 5

| Parameter | Value |
| --- | --- |
| Screw RPM | 102 |
| Zone 1 (F.) | 450 |
| Zone 2 (F.) | 517 |
| Zone 3 (F.) | 500 |
| Adapt (F.) | 500 |
| Necktube (F.) | 520 |
| Die (F.) | 490 |
| Die edge heaters (F.) | 500 |
| Pressure (psi) | 3000 |

The molten extrudate was taken away on a dual belt laminator (Meyer KFE-E 1500; Meyer GmbH, Rötz, Germany), running at 2.5 ft/min. The lower belt extended slightly toward the working face of the die and was positioned a few cm below the working face so that the molten extrudate was collected on the lower belt and then carried into the gap between the lower belt and the upper belt. Two biaxially oriented PET films were unwound into the dual belt laminator so that the molten extrudate/incipient foam was sandwiched between upper and lower PET films, with a PET film being laminated to each major surface of the resulting PET foam. The surface of each PET film that was contacted with the molten extrudate had been flashlamped in the general manner disclosed in U.S. patent application Ser. No. 14/363,132, entitled "Methods of Bonding Polyester Substrates".

The dual-belt laminator was operated under the conditions listed in Table 6:

TABLE 6

| Parameter | Value |
| --- | --- |
| Belt height (mm) | 12 |
| Internal nip (mm) | 1.5 |
| Laminator Zone 1 (C.) | 190 |
| Laminator Zone 2 (C.) | 120 |
| Laminator Zone 3 (C.) | 23 |

The belt height is the separation distance between the top and bottom belts of the dual belt laminator. The dual belt laminator has an internal nip approximately halfway in its length. The internal nip parameter is defined as the amount the nip is compressing the belts. For example a belt height of 10 mm sets the gap at 10 mm, and with a 1 mm internal nip setting, the gap at the nip is then set to 9 mm.

The thus-formed laterally-coalesced unitary foam slab exhibited approximate (average) values of 0.40 g/cc density (of the foam core), 6.0 inch width, and 0.25 inch thickness (having been constrained by the belts of the dual-belt laminator, from expanding to the same degree as in e.g. the Representative Working Example).

Working Example 6

A shim-stack foaming die was assembled of the type described Working Example 4. First and second compositions of the same compositions as in Working Example 4, were processed by way of first and second extruders. However, rather than the first and second flowstreams feeding different die cavities/sets of die orifices, the first (foamable) molten flowstream and the second (non-foamable, PET-G) molten flowstream were combined at a common inlet to the die to form a multilayer flowstream comprising an inner layer that was a foamable composition, and upper and lower layers (outer layers) of PET-G. The first and second compositions were processed, with the resulting molten extrudate being collected in a dual-belt laminator along with top and bottom layers of flashlamped PET film (in similar manner as in Working Example 5), under the conditions listed in Table 7:

TABLE 7

| | 1st Extruder/ composition | 2nd Extruder/ composition |
| --- | --- | --- |
| Screw RPM | 90 | 22 |
| Zone 1 (F.) | 437 | 450 |
| Zone 2 (F.) | 511 | 505 |
| Zone 3 (F.) | 539 | 530 |
| Adapt (F.) | 517 | 500 |

TABLE 7-continued

| | 1st Extruder/ composition | 2nd Extruder/ composition |
| --- | --- | --- |
| Necktube (F.) | 511 | 511 |
| Pressure (psi) | 2740 | 3350 |
| Die (F.) | 480 | |
| Die edge heaters (F.) | 500 | |
| Belt speed (ft/min) | 1.65 | |
| Zone 1 top (° C.) | 140 | |
| Zone 1 bottom (° C.) | 130 | |
| Zone 2 top (° C.) | 140 | |
| Zone 2 bottom (° C.) | 130 | |
| Belt Height (mm) | 11.5 | |
| Internal nip (mm) | 1 | |

The flashlamped PET films were thus laminated to PET-G surface layers that were present on each major surface of the thus-formed foam slab. The thus-formed laterally-coalesced unitary composite foam slab (bearing PET films laminated thereto) exhibited approximate (average) values of 0.45 g/cc density (of the foam core), 3.0 inch width, and 0.375 inch thickness.

Working Example 7

A shim-stack foaming die was assembled of the type described in the Representative Working Example. A foamable composition was prepared, comprising high melt strength polypropylene (Borealis WB140HMS) at 96 wt. %, and a chemical blowing agent (EcoCell Chemical Blowing Agent; Polyfil, Rockaway, N.J.) at 4 wt. %. The foamable composition was processed under the conditions listed in Table 8:

TABLE 8

| Parameter | Value |
| --- | --- |
| Screw RPM | 100 |
| Zone 1 (F.) | 350 |
| Zone 2 (F.) | 420 |
| Zone 3 (F.) | 400 |
| Adapt (F.) | 400 |
| Necktube (F.) | 390 |
| Die (F.) | 390 |
| Die edge heaters (F.) | 390 |
| Pressure (psi) | 3680 |

The molten extrudate was taken away on a dual belt laminator running at 2.7 ft/min. The lower belt extended slightly toward the working face of the die and was positioned a few cm below the working face so that the molten extrudate was collected on the lower belt and then carried into the gap between the lower belt and the upper belt. Two glass-fiber-reinforced polypropylene (GFPP) films were unwound into the dual belt laminator so that the molten extrudate/incipient foam was sandwiched between upper and lower GFPP films, with each GFPP film laminated to a major surface of the molten extrudate. (The GFPP films had been made using Borealis Fibremod GB306SAF (35 wt. % glass fibers) resin pellets in standard cast film extrusion equipment (single screw extruder, 3-roll casting station, and winder.) The thus-formed laterally-coalesced unitary foam slab (with GFPP films laminated thereto) exhibited approximate (average) values of 0.50 g/cc density (of the foam core), 2.5 inch width, and 0.375 inch thickness.

The foregoing Examples have been provided for clarity of understanding only, and no unnecessary limitations are to be understood therefrom. The tests and test results described in the Examples are intended to be illustrative rather than predictive, and variations in the testing procedure can be expected to yield different results. All quantitative values in the Examples are understood to be approximate in view of the commonly known tolerances involved in the procedures used. It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document incorporated by reference herein, this specification as written will control.

What is claimed is:

1. A laterally-coalesced unitary organic polymeric foam slab:
   wherein at least eight interfacial boundaries are encountered in traversing the width of the foam slab along a lateral axis of the foam slab; wherein the interfacial boundaries are at least generally aligned with a thickness axis of the foam slab, and wherein the foam slab is compositionally uniform along a long axis of the foam slab.

2. The unitary foam slab of claim 1, wherein the unitary foam slab comprises at least one major, foam layer that comprises a polyester foam or a polypropylene foam.

3. The unitary foam slab of claim 1, wherein the unitary foam slab consists of a single layer of polyester foam or a single layer of polyolefin foam.

4. The unitary foam slab of claim 1, wherein at least twelve interfacial boundaries are encountered in traversing the width of the foam slab along a lateral axis of the foam slab; and, wherein the interfacial boundaries are at least substantially aligned with a thickness axis of the foam slab.

5. The unitary foam slab of claim 1, wherein at least twenty interfacial boundaries are encountered in traversing the width of the foam slab along a lateral axis of the foam slab; and, wherein the interfacial boundaries are at least essentially aligned with a thickness axis of the foam slab.

6. The unitary foam slab of claim 1,
   wherein the foam slab is a unitary composite foam slab that comprises a major organic polymeric foam phase that makes up from about 50 volume % of the slab to about 99.5 volume % of the slab and that comprises a relative density of less than about 0.85,
   wherein the unitary composite foam slab comprises a minor, organic polymeric densified phase that makes up from about 0.5 volume % to about 50 volume % of the unitary composite foam slab and that comprises a relative density that is at least about 50% greater than the relative density of the major organic polymeric foam phase,
   and wherein the major phase and the minor phase each extend continuously along a long axis of the unitary composite foam slab.

7. The unitary composite foam slab of claim 6 wherein the minor, densified phase of the unitary composite foam slab is melt-bonded to the major, foam phase of the unitary composite foam slab.

8. The unitary composite foam slab of claim 7 wherein the minor, densified phase of the unitary composite foam slab, and the major, foam phase of the unitary composite foam slab, are both comprised of polyester or are both comprised of polyolefin.

9. The unitary composite foam slab of claim 6 wherein the minor, densified phase of the composite foam slab is in the form of a plurality of elongate members that are spaced apart, along a lateral axis of the foam slab, across at least 70% of a width of the foam slab, wherein each elongate member extends continuously along the long axis of the composite foam slab, and wherein each elongate member comprises a relative density that is at least about four times the relative density of the major, foam phase of the composite foam slab.

10. The unitary composite foam slab of claim 9 wherein each elongate member is in the form of an elongate rail that comprises a rail height that is at least substantially aligned with a thickness axis of the unitary composite foam slab and a rail width that is at least generally aligned with a lateral axis of the unitary composite foam slab, and wherein the rail height is at least four times the rail width, and wherein the rail height is at least about 80% of the thickness of the unitary composite foam slab.

11. The unitary composite foam slab of claim 9 wherein each elongate member consists essentially of a non-foam material that is melt-bonded to the major, foam phase of the unitary composite foam slab.

12. The unitary composite foam slab of claim 6 wherein the minor, densified phase of the unitary composite foam slab is in the form of a minor, surface layer that provides a major outer surface of the unitary composite foam slab, that has a thickness that is less than about 10% of a total thickness of the unitary composite foam slab, and that exhibits a relative density that is at least about four times the relative density of the major, foam phase of the unitary composite foam slab.

13. The unitary composite foam slab of claim 12 wherein the minor, surface layer of the unitary composite foam slab consists essentially of a non-foam material that is melt-bonded to the major, foam phase of the unitary composite foam slab.

14. The unitary composite foam slab of claim 13 wherein the minor, surface layer of the unitary composite foam slab, and the major, foam phase of the unitary composite foam slab, are both comprised of polyester or are both comprised of polyolefin.

15. The unitary composite foam slab of claim 6 wherein the minor, densified phase of the unitary composite foam slab is in the form of:
   a first minor surface layer that provides a first major outer surface of the unitary composite foam slab, that has a thickness that is less than about 10% of the total thickness of the unitary composite foam slab, and that exhibits a relative density that is at least about four times the relative density of the major phase of the unitary composite foam slab;

and, a second minor surface layer that provides a second major outer surface of the unitary composite foam slab, that has a thickness that is less than about 10% of the total thickness of the unitary composite foam slab, and that exhibits a relative density that is at least about four times the relative density of the major phase of the unitary composite foam slab.

16. The unitary composite foam slab of claim 15 wherein the first minor, surface layer of the unitary composite foam slab, the second minor, surface layer of the unitary composite foam slab, and the major, foam phase of the unitary composite foam slab, are all comprised of polyester or are all comprised of polyolefin.

17. An article comprising the unitary organic polymeric foam slab of claim 1 with a substrate laminated to at least one major surface of the unitary composite foam slab.

18. The article of claim 17 wherein the substrate is a biaxially oriented polymer film or a laminated stack of biaxially oriented polymer films.

19. The article of claim 17 wherein the substrate is chosen from the group consisting of a fiber-reinforced polymeric film or sheet, a woven fabric, a knitted fabric, a nonwoven, and a metal foil.

* * * * *

UNITED STATES PATENT AND TRADEMARK OFFICE
CERTIFICATE OF CORRECTION

PATENT NO. : 10,449,702 B2  
APPLICATION NO. : 15/517033  
DATED : October 22, 2019  
INVENTOR(S) : Jim Jonza et al.

Page 1 of 1

It is certified that error appears in the above-identified patent and that said Letters Patent is hereby corrected as shown below:

In the Specification

Column 15  
Line 44, delete "$(d_e)$" and insert -- $(d_c)$ --, therefor.

Column 16  
Line 44, delete "$(D_e)$" and insert -- $(D_c)$ --, therefor.  
Line 60, delete "$(d_e)$" and insert -- $(d_c)$ --, therefor.

Column 17  
Line 26, delete "$(D_e)$" and insert -- $(D_c)$ --, therefor.  
Line 59, delete "$(D_e)$" and insert -- $(D_c)$ --, therefor.

Column 18  
Line 7, delete "$(d_e)$" and insert -- $(d_c)$ --, therefor.  
Line 37, delete "$(D_e)$" and insert -- $(D_c)$ --, therefor.

In the Claims

Column 21  
Line 36, in Claim 1, delete "slab:" and insert -- slab; --, therefor.

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*